United States Patent [19]

Church et al.

[11] Patent Number: 4,619,764

[45] Date of Patent: Oct. 28, 1986

[54] REPELLING-ACTION FILTER UNIT AND ASSEMBLY

[75] Inventors: John F. Church; Walter H. Stone; Richard E. Schaupp, all of Modesto, Calif.

[73] Assignee: Parker-Hannifin Corporation, Cleveland, Ohio

[21] Appl. No.: 622,163

[22] Filed: Jun. 19, 1984

[51] Int. Cl.[4] .............................................. B01D 27/08
[52] U.S. Cl. .................................... 210/248; 210/303; 210/312
[58] Field of Search .................... 210/97, 99, 104, 111, 210/114, 232, 238, 242, 300, 301, 311, 313, 315, DIG. 5, 416.1, 416.4, 437, 438, 441, 442, 445, 450, 451, 452, 453, 248, 303, 312, 315; 123/196 A, 196 R

[56] References Cited

U.S. PATENT DOCUMENTS

| | | | |
|---|---|---|---|
| 1,002,792 | 9/1911 | Weitzenhoffer | 210/416.5 |
| 1,616,577 | 2/1927 | Janette | 210/248 |
| 2,326,691 | 8/1943 | Schum | 210/165 |
| 2,494,884 | 1/1950 | Lassman et al. | 210/416.5 |
| 2,524,336 | 10/1950 | Vokes | 210/303 |
| 2,651,414 | 9/1953 | Lawson | 210/DIG. 5 |
| 3,154,487 | 10/1964 | Thornton et al. | 210/323.1 |
| 3,199,676 | 8/1965 | May | 210/114 |
| 3,228,527 | 1/1966 | McPherson | 210/DIG. 5 |
| 3,280,981 | 10/1966 | Renfrew | 210/303 |
| 3,508,658 | 4/1970 | McVay | 210/114 |
| 4,231,768 | 11/1980 | Seibert et al. | 210/DIG. 5 |
| 4,253,954 | 3/1981 | Midkiff et al. | 210/DIG. 5 |
| 4,437,986 | 3/1984 | Hutchins et al. | 210/DIG. 5 |
| 4,500,425 | 2/1985 | Thornton et al. | 210/416.4 |
| 4,502,955 | 3/1985 | Schaupp | 210/DIG. 5 |
| 4,502,956 | 3/1985 | Wilson et al. | 210/248 |

FOREIGN PATENT DOCUMENTS 2078536A 6/1981 United Kingdom .

*Primary Examiner*—Richard V. Fisher
*Assistant Examiner*—Wanda L. Millard
*Attorney, Agent, or Firm*—Kerkam, Stowell, Kondracki, & Clarke

[57] ABSTRACT

A filter assembly and associated filter unit includes a repelling-action filter media for use in vacuum or suction side fuel filter applications. In particular, the filter unit is a screw on unit with centrally located threads at opposite ends of the filter unit and with a specifically designed end cap allowing use of the filter unit with a dual zone collection bowl normally used for coalescing pressure side filter applications. The end cap includes holes which allow use of both of the collection zones in spite of the normal isolation between the collection zones.

28 Claims, 4 Drawing Figures

REPELLING-ACTION FILTER UNIT AND ASSEMBLY

BACKGROUND OF THE INVENTION

This invention relates to a filter unit and associated assembly useful for removing contaminants such as water and particulate matter from fuel, especially diesel fuel. The invention is especially adapted for vacuum side (also called suction side) placement of the filter.

Numerous types of fuel filter separator units have heretofore been used to remove particulate and liquid (e.g., water) contaminants from fuel.

As used herein, "filter", "fuel filter", or "filter unit" shall include any device for separating particulate and/or liquid contaminants from fuel. Thus, fuel filter/separator units will be referred to simply as fuel filters or filter units.

The fuel filter as used with diesel engines may be placed on either the pressure side of the fuel pump or on the suction side of the fuel pump. When fuel passes through the fuel pump, any water in the fuel is usually broken down into very small or micro droplets. This emulsification of the water in the fuel makes it somewhat more difficult to separate the water from the fuel then would otherwise be the case. Accordingly, a suction or vacuum side filter may operate satisfactorily if it will separate out relatively large droplets of water, whereas a pressure side filter must be designed to separate out very small droplets of water.

A problem common to numerous prior art filter assemblies is their lack of flexibility. In particular, such assemblies often are limited to either vacuum side applications or pressure side application. A filter which is quite satisfactory for vacuum side applications may not function properly to separate out water which has been emulsified by passage through the pump in a pressure side application.

Assemblies which are designed to operate in pressure side application commonly have coalescing media in order to coalesce small water droplets into larger droplets. Such designs may include dual contaminant collection zones, one collection zone upstream from the coalescing media and a second collection zone downstream from the coalescing media. Coalescence and H2O saturation may result in differential pressure across the wall separating these collection zones. These collection zones must be separated to avoid fluid bypassing the filter media across them. On the other hand, the isolation between the two collection zones is disadvantageous in a vacuum or suction side application where most of the contaminant settles on one side of the medium. Specifically, the isolation between the two collection zones limits the volume of contaminant collection to the reservoir in which most of the contaminant settles leaving the other partially or fully unused.

Although a coalescing filter may be used on the suction side of the fuel pump, its advantageous ability to remove smaller water droplets is generally unnecessary in such an application. Moreover, the use of a so-called quiet zone gap between a first coalescing filter media and a second filter media (as commonly used to allow water droplets to drop from the fuel) limits the capacity of the filter to hold dirt and, therefore, limits the life of the filter. Further, the extra cost (due to increased complexity) of a coalescing filter is not usually justified for suction side filter application.

In addition to lack of adaptability to both pressure and vacuum side applications, numerous prior art designs use contaminant collection zones which are hard to attach or remove.

Another problem common with fuel filter assemblies is that the filter elements become restricted too quickly. At the same time, attempts to design filter elements and assemblies for extended element life often result in complex and costly structures.

OBJECTS AND SUMMARY OF THE INVENTION

It is a general object of the present invention to provide an improved filter unit and assembly.

It is another object of the present invention to provide a vacuum side filter which may use a dual collection zone contaminant bowl normally used with a pressure side filter unit.

Another object of the present invention is to provide a filter unit and assembly arranged to provide extended life for the filter unit.

A further object of the present invention is to provide a filter unit and assembly with high efficiency water separation and high capacity for holding particulate contaminants.

The above and other objects of the present invention are provided by a filter assembly adapted to remove contaminants from liquid fuel comprising: a filter unit having a body and water repelling-action filter media disposed in a closed loop therein, the body having a fuel inlet port and a fuel outlet port and first and second contaminant outlets, the first and second contaminant outlets disposed on a first side of the body, both the first and second contaminant outlets directly communicating with a common chamber within the filter media; a contaminant collection bowl supported by the body and releasably engaged to the first side of the body, the collection bowl having separate first and second collection zones with a separation wall therebetween, the first collection zone disposed below the first contaminant outlet to collect liquid contaminants from the first contaminant outlet as fuel passes through the filter unit, the second collection zone disposed below the second contaminant outlet to collect liquid contaminant from the second contaminant outlet as fuel passes through the filter unit; first and second drain ports for respectively draining the first and second collection zones; and wherein, in operation, the first and second collection zones are completely walled off from each other by the separation wall with the only communication between the first and second collection zones being through the body by way of the first contaminant outlet, and the first and second contaminant outlets allow free communication between the first and second collection zones. The fuel inlet port and the first contaminant outlet are each centrally located within threads on opposite sides of the body. The collection bowl includes centrally located threads engaged to central mating threads on the first side of the body, and the first contaminant outlet is within the mating threads of the body, and the second contaminant outlet is outside of the mating threads of the body. The body is cylindrical and the second contaminant outlet is one of first series of holes outside of the mating threads arranged in a circumferential pattern and radially inward from the filter media. The collection bowl threads are mounted at the top of the separation wall. The body comprises an outer casing and an end cap, the outer casing having a central hole on the first side of the body, and wherein the first contaminant outlet and the first series of holes extend through the end cap and are disposed within the central hole of the outer casing. The outer casing further has a second series of holes arranged in a circumferential pattern on the first side of the body and the end cap plugs the second series of holes. The outer casing is made of metal and the end cap is made of plastic. The filter media within the filter unit is single, integral, and radially continuous. The body is cylindrical and the second contaminant outlet is radially inward from the filter media.

The present invention may alternately be described as a filter assembly adapted to remove contaminants from liquid fuel comprising: a suction-side filter unit having a body and single, integral, radially continuous annular filter media disposed therein, the body having a fuel inlet port and a fuel outlet port and first and second contaminant outlets, the first and second contaminant outlets disposed on a first side of the body, both the first and second contaminant outlets directly communicating with a common chamber within the filter media; a contaminant collection bowl supported by the body and releasably engaged to the first side of the body, the collection bowl having separate first and second collection zones with a separation wall therebetween, the first collection zone disposed below the first contaminant outlet to collect liquid contaminants from the first contaminant outlet as fuel passes through the filter unit, the second collection zone disposed below the second contaminant outlet to collect liquid contaminant from the second contaminant outlet as fuel passes through the filter unit; and first and second drain ports for respectively draining the first and second collection zones; and wherein, in operation, the first and second collection zones are completely walled off from each other by the separation wall with the only communication between the first and second collection zones being through the body by way of the first contaminant outlet, and wherein the first and second contaminant outlets allow free communication between the first and second collection zones. The body is cylindrical and the second contaminant outlet is radially inward from the filter media. The filter media includes at least a water repelling-action portion.

The present invention may alternately be described as an invention comprising a water repelling-action filter unit including: a cylindrical body having a fuel inlet port and a fuel outlet port, and first and second contaminant outlets disposed on a first side of the body, both the first and second contaminant outlets directly communicating with a common chamber within the body; a water repelling-action filter media disposed in a closed loop within the body and around the common chamber; and central mating threads on the first side of the body for mating with centrally located threads on a contaminant collection bowl, the first contaminant outlet within the mating threads of the body and the second contaminant outlet outside of the mating threads of the body; and wherein the filter unit is operative to support a contaminant collection bowl with separate first and second contaminant collection zones disposed respectively beneath the first and second contaminant outlets. The second contaminant outlet is one of a first series of holes arranged in a circumferential pattern outside of the mating threads and all in direct communication with the common chamber, and the common chamber is centrally located. The first series of holes are radially inward from the filter media. The filter media within the filter cartridge is single, integral, and radially continuous. The fuel inlet port is centrally located on a second side of the body opposite the first side of the body and the fuel inlet port is bounded by second side threads and the fuel outlet port is on the second side of the body outside the second side threads. The body comprises an outer casing and an end cap, the outer casing having a central hole on the first side of the body, and wherein the first contaminant outlet and first series of holes extend through the end cap and are disposed within the central hole of the outer casing. The outer casing further has a second series of holes arranged in a circumferential pattern on the first side of the body and the end cap plugs the outer series of holes. The outer casing is made of metal and the end cap is made of plastic. The invention further comprises: a contaminant collection bowl supported by the body and releasable engaged to the first side of the body, the collection bowl having separate first and second collection zones with a separation wall therebetween, the first collection zone disposed below the first contaminant outlet to collect liquid contaminants from the first contaminant outlet as fuel passes through the filter unit, the second collection zone disposed below the second contaminant outlet to collect liquid contaminant from the second contaminant outlet as fuel passes through the filter unit; first and second drain ports for respectively draining the first and second collection zones; and wherein, in operation, the first and second collection zones are completely walled off from each other by the separation wall with the only communication between the first and second collection zones being through the body by way of the first contaminant outlet, and wherein the first and second contaminant outlets allow free communication between the first and second collection zones.

BRIEF DESCRIPTION OF THE DRAWINGS

The above and other objects of the present invention which will become more readily apparent from the following detailed description when considered in conjunction with the accompanying drawings wherein like characters represent like parts throughout the several views and in which.

DETAILED DESCRIPTION OF THE INVENTION

Figure 1:
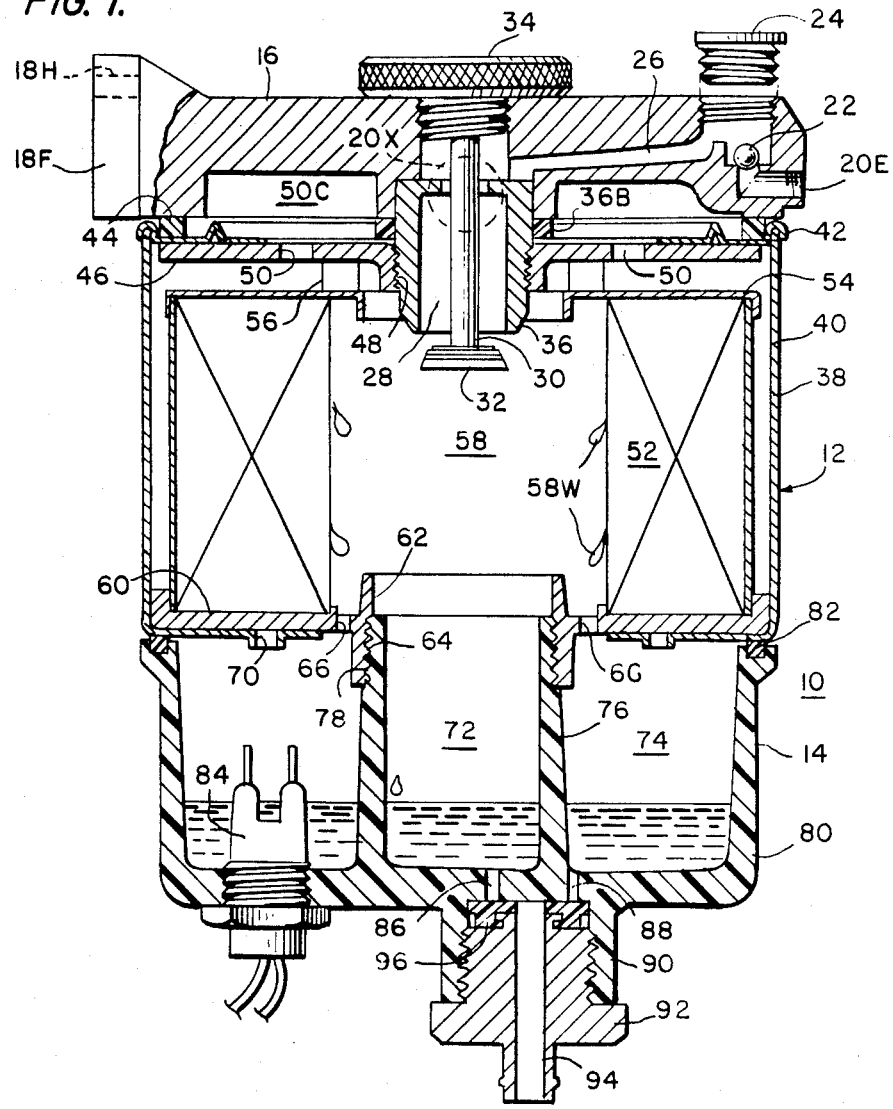
FIG. 1 shows a cross-section side view of a filter unit and assembly according to the present invention.

Turning now to FIG. 1, a cross-section of the filter assembly 10 according to the present invention will be discussed in detail. The filter assembly 10 includes a filter unit 12, a contaminant collection bowl 14, and a cap 16. The cap 16 is shown in only partial cross-section. The filter unit 12, collection bowl 14, and cap 16 are all substantially cylindrical except that the cap 16 includes a mounting flange 18F with mounting holes 18H (only one visible) for mounting the filter assembly 10 to a diesel truck engine, car engine, or other industrial machine.

The cap 16 includes a threaded fuel entry port 20E leading to ball check valve 22 which is accessible by way of threadably removable plug 24. A passage 26 extends from the ball check valve 22 to allow fuel flow into a cylindrical downwardly extending plunger zone 28 in which plunger rod 30 extends. The plunger rod 30 is attached at its bottom to a pliant plunger element 32 and is attached at its top to a threadably mounted knob 34. A fuel exit port 20X is disposed in orthogonal fashion to the entry port 20E. If desired, an additional fuel exit port (not shown) may be located directly opposite the exit port 20X and removable plugs may be provided for the exit ports, a plug being removed depending upon which exit port is to be used. The cap 16 further includes the externally threaded (at lower end) and centrally located cylinder 36. The cylinder may also include upper threads (not shown) to screw into the main part of cap 16 by bolt 36B which is welded to cylinder sleeve 36. Alternately, sleeve 36 could be welded to the upper part of cap 16.

Figure 2:
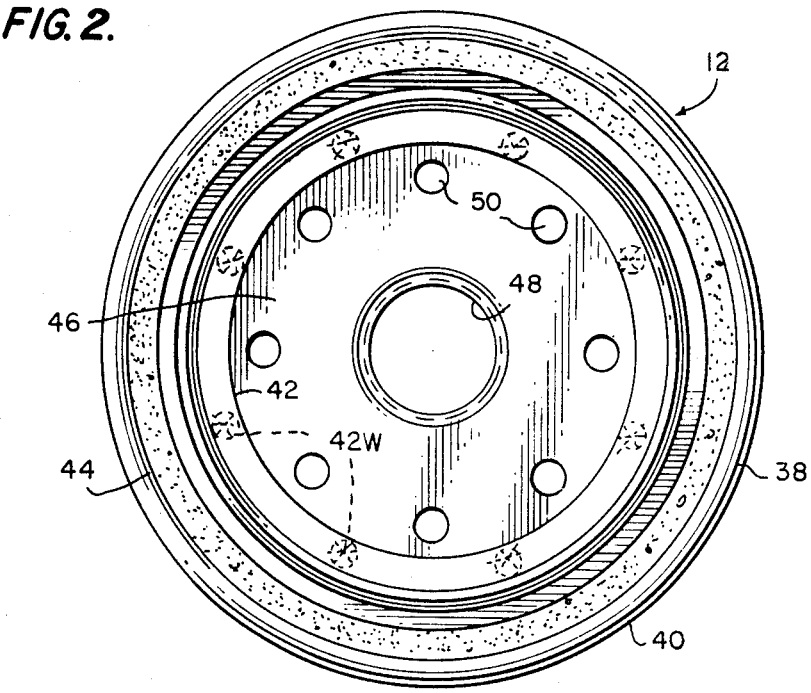
FIG. 2 shows a top view of a filter unit according to the present invention.

As shown in FIG. 1, a fuel filter unit 12 is threadably attached to the threads on sleeve 36. The filter unit 12 includes a cylindrical body 38 having a metallic outer casing 40 and a metallic ring piece 42 having a groove for seating O-ring seal 44. An upper metallic disc piece 46 is attached to the ring piece 42 and includes central threads 48 which may threadably attach to the threads of cylinder sleeve 36 to hold the filter unit 12 to the cap 16. Fuel may enter the filter unit 12 by way of the fuel inlet port within the threads 48. Fuel may exit from the filter unit 12 by way of the fuel outlet ports 50 which are circumferentially arranged around the hole defined within threads 48 (see also FIG. 2). The metallic pieces 40, 42, and 46 may be welded or otherwise attached together. Weld points 42W are shown circumferentially spaced around piece 42 in FIG. 2. A filter media 52 is disposed within the filter unit 12. Preferably, this filter media 52 is single, integral (includes only a single piece, although the piece might have separate zones), radially continuous (there are no radial gaps other than random interstitial spacing), and homogenous. The filter media 52 is preferably made of fiberglass and cellulose in a known water repelling-action construction. Filter media 52 is bounded by an upper piece 54 spaced from piece 46 by a gasket 56. The annular filter media 52 surrounds a centrally located cylindrical chamber 58 as shown in FIG. 1.

Figure 3:
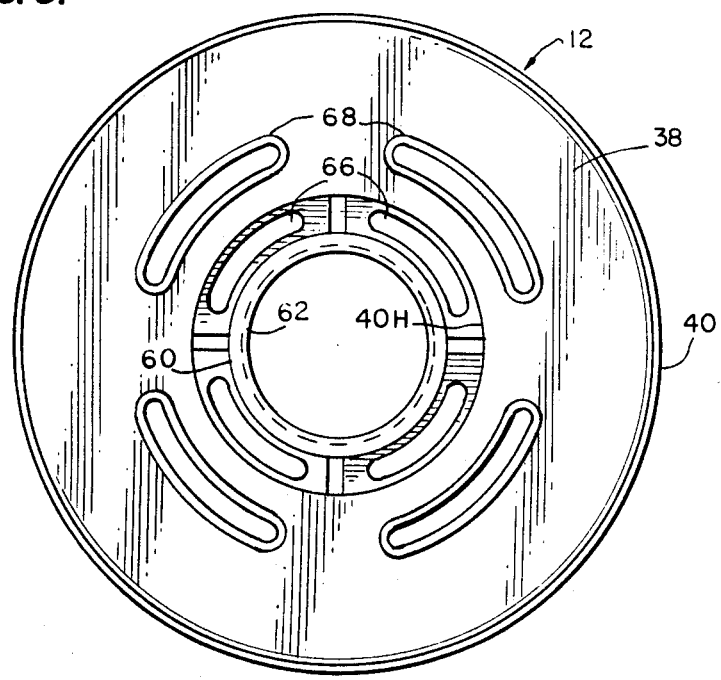
FIG. 3 shows a bottom view of a filter unit according to the present invention.

The filter media 52 is bounded on its lower end by a bottom end cap 60 made of plastic and including a cylindrical portion 62 including threads 64. As shown, the bottom cap 60 is mounted at the bottom of the outer casing 12 and spaces the filter media 52 from the bottom side of the outer casing 40. The bottom cap 60 further includes annular holes or slots 66 arranged in a circumferential pattern as best shown in the bottom view of the filter unit 12 of FIG. 3. As best shown in FIG. 3 also, the outer casing 38 includes a circumferential arrangement of slots 68 which, as shown in FIG. 1, are plugged by the plastic end cap 60 including its downwardly extending flanges 70.

Continuing to view FIG. 1, and also considering the detailed cross-section view of FIG. 4, the collection bowl 14 as used with the present invention will be discussed in detail. The collection bowl 14 includes a central contaminant collection chamber or zone 72 and an annular second contaminant collection zone or chamber 74 which is separated from the zone 72 by a cylindrical separation wall 76 including threads 78 for threading the collection bowl onto the central mating threads 64 of the filter unit 12. The outer cylindrical wall 80 includes an O-ring 82 to seal the space between the contaminant collection zone 74 and outside of the assembly 10.

The collection bowl 14 is preferably made of a clear plastic material to allow one to visually inspect the fill level. Additionally, if desired, an electric level sensing device 84 may be used with the collection bowl. The device 84 is shown as a normally open circuit device which will close when the water level rises sufficiently high to close the circuit between its upper electrodes. Numerous other types of level sensors could be used. Regardless of the particular type of level sensor, the level sensor may simply be used to activate a light attached to a control panel or vehicle dashboard. The light would illustrate the need for draining the contaminant collection bowl 14.

The draining of the contaminant collection bowl 14 is relatively straightforward. In particular, the central contaminant collection zone 72 includes an outlet port 86 and the second contaminant collection zone 74 includes an outlet port 88. The outlet ports 86 and 88 extend to a cylindrical portion 90 below the main part of the collection bowl 14. The cylindrical portion 90 includes internal threads into which plug 92 is removably attached. Plug 92 includes a central passageway 94 and a rubber seal 96. In the position shown in FIG. 1, the rubber seal 96 will block the contaminant outlet ports 86 and 88 because the plug 92 is screwed up tightly within the cylindrical portion 90. When the plug 92 is screwed down to the position shown in FIG. 4, contaminants may readily flow out of the first and second contaminant collection zones 72 and 74 by way of the first and second contaminant outlet ports 86 and 88 and the passage 94 in plug 92.

Figure 4:
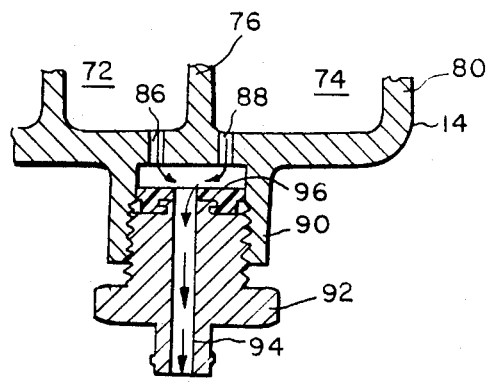
FIG. 4 shows a detailed cross-section view of a drain as used with the collection bowl in the filter assembly of the present invention.

The collection bowl 14 is substantially similar in operation to a collection bowl shown in FIG. 4 of U.S. patent application Ser. No. 351,761 filed by Wilson et al on Feb. 24, 1982, now abandoned in favor of U.S. patent continuation application Ser. No. 568,271 filed on Jan. 3, 1984, now U.S. Pat. No. 4,502,956 issued Mar. 5, 1985, these applications being assigned to the assignee of the present application. Additionally, the cap 16 of the present invention is generally similar in operation to a cap shown in the Wilson et al application. The filter media may be the same construction as used with the outer media in the Wilson et al application.

Operation

In operation, fuel may enter the cap 16 by entry port 20E and pass by the ball valve 22 which functions as a one way or check valve to prevent back flow of fuel when knob 34 and element 32 are used to prime the filter unit 12. The fuel passes through passageway 26 down the plunger zone 28 to the interior central chamber 58 of the filter unit 12. A pump (not shown) causes a suction at the fuel outlet port 20X which generally powers the flow of fuel. The fuel within chamber 58 will proceed radially outward through the filter media 52 out the fuel outlet ports 50 to an annular fuel outlet chamber 50C and out fuel exit 20X. However, the relatively large drops of water 58W will be repelled by the radially inner surface of the filter media 52 due to the large size of these droplets. Although not shown, the inner radial surface of fiberglass and cellulose filter media 52 may be pleated to aid in the repelling action. Particulate matter and especially large droplets of water or other liquid contaminants may proceed downwardly through the first contaminant outlet defined within cylindrical portion 62 and rest within the contaminant collection zone 72 prior to contact with media 52. The water droplets 58W which are repelled by the filter media 52 may proceed downwardly and out of the holes 66 within the plastic end cap 60. Any of the holes 66 may be considered as a second contaminant outlet (as opposed to the first contaminant outlet defined within the cylindrical portion 62) and disposed radially inward from the filter media 52.

As shown, the first contaminant outlet defined within cylindrical portion 62 and the second contaminant outlet (any of the holes 66) allow free (unencumbered by any filter, baffle, or similar arrangement) communication between the first and second contaminant collection zone 72 and 74. Accordingly, if the first contaminant collection zone 72 fills before the second contaminant collection zone 74, contaminants from the first collection zone 72 may flow into the second zone 74 notwithstanding the isolation caused by separation wall 76, which separation wall is necessary to isolate collection zones 72 and 74 when the collection bowl 14 is used with a coalescing filter in the manner disclosed in the above referenced Wilson et al U.S. patent application. Likewise, if the contaminant collection zone 74 fills before collection zone 72, the free communication by way of holes 66 and the hole within cylindrical portion 62 will allow both contaminant collection zones to be utilized. Holes 66 and the hole within threads 64 are both radially inward from the central hole 40H (FIG. 3) in the bottom of outer casing 40.

The inclusion of the slots 68 in the outer metallic casing 40 is advantageous in that the outer casing 40 may be standardized for both the vacuum or suction side filter unit 12 of FIG. 1 and for the coalescing filter arrangement as shown in FIG. 4 of the above listed Wilson et al application. Specifically, the coalescing filter of FIG. 4 of the Wilson et al application may be constructed using the same outer casing 12 but simply including a different filter media arrangement and perforations corresponding to the slots 68 instead of the perforations or holes 66 in the end cap 60. In this manner, a single outer casing design 40 and end cap 60 may be used with the variation between vacuum and pressure side application realized by simply punching out different parts of the plastic of bottom or end cap 60.

Upon the realization that the collection bowl 14 is relatively full (either by visual inspection of the clear plastic or by receiving a signal from the level sensor 84) the drain plug 92 may be used to simultaneously drain both collection zones 72 and 75 of the collection bowl 14. When the filter unit 12 needs replacement, its threads 48 and 64 allow it to be easily unscrewed from the cap 12 and collection bowl 14 and a new filter unit may be simply screwed into place by the centrally located threads at both ends of the filter unit 12.

An advantageous feature of the centrally located threads 48 and 64 of the filter unit 12 of the present invention is that such centrally located threads are less likely to be improperly screwed into position compared to threads which would be at the outer ring of a filter unit. That is, a smaller and tighter thread is less likely to be screwed on in a cockeyed position.

By the inclusion of the circumferential pattern of holes 66 in the end cap 60, the vacuum or suction side filter unit 12 of the present invention may be used with a collection bowl 14 which is also useful with the dual collection zone coalescing type filter units. Most advantageously, these holes 66 allow use of both of the contaminant collection zones 72 and 74 of the collection bowl 14.

Although various specific constructions and details have been given herein, it is be understood that these are for illustrative purposes only. Various modifications and adaptations will be readily apparent to those of ordinary skill in the art. Accordingly, the scope of the present invention should be determined by reference to the claims appended hereto.

What is claimed is:

1. A filter assembly operable to remove contaminants from liquid fuel comprising:
   (a) a filter unit having a body and a water repelling-action filter media disposed in a closed loop therein, said body having a fuel inlet port and a fuel outlet port and first and second contaminant outlets, said first and second contaminant outlets disposed on a first side of said body, both said first and second contaminant outlets directly communicating with a common central chamber within said filter media;
   (b) a contaminant collection bowl supported by said body and releasably engaged to said first side of said body, said collection bowl having separate first and second collection zones with a separation wall therebetween, said first collection zone disposed below said first contaminant outlet to collect liquid contaminants from said first contaminant outlet as fuel passes through the filter unit, said second collection zone disposed below said second contaminant outlet to collect liquid contaminant from said second contaminant outlet as fuel passes through the filter unit;
   (c) first and second drain ports for respectively draining said first and second collection zones; and
   wherein, in operation, said first and second collection zones are completely walled off from each other by said separation wall with the only communication between said first and second collection zones being through said body by way of said first contaminant outlet, and wherein said first and second contaminant outlets allow free communication between said first and second collection zones.

2. The filter assembly of claim 1 wherein said fuel inlet port and said first contaminant outlet are each centrally located within threads on opposite sides of said body.

3. The filter assembly of claim 1 wherein said collection bowl includes centrally located threads engaged to central mating threads on said first side of said body, and said first contaminant outlet is within said mating threads of said body, and said second contaminant outlet is outside of said mating threads of said body.

4. The filter assembly of claim 3 wherein said body is cylindrical and said second contaminant outlet is one of a first series of holes outside of said mating threads arranged in a circumferential pattern and radially inward from said filter media.

5. The filter assembly of claim 4 wherein said collection bowl threads are mounted at the top of said separation wall.

6. The filter assembly of claim 5 wherein said body comprises an outer casing and an end cap, said outer casing having a central hole on said first side of said body, and wherein said first contaminant outlet and said first series of holes extend through said end cap and are disposed within said central hole of said outer casing.

7. The filter assembly of claim 6 wherein said outer casing further has a second series of holes arranged in a circumferential pattern on said first side of said body and said end cap plugs said second series of holes.

8. The filter assembly of claim 7 wherein said outer casing is made of metal and said end cap is made of plastic.

9. The filter assembly of claim 3 wherein said filter media within said filter unit is single, integral, and radially continuous.

10. The filter assembly of claim 1 wherein said body is cylindrical and said second contaminant outlet is radially inward from said filter media.

11. A filter assembly operable to remove contaminants from liquid fuel comprising:
(a) a suction-side filter unit having a body and single, integral, radially continuos, annular filter media disposed therein, said body having a fuel inlet port and a fuel outlet port and first and second contaminant outles, said first and second contaminant outlets disposed on a first side of said body, both of said first and second contaminant outlets directly communicating with a common chamber within said filter media;
(b) a contaminant collection bowl supported by said body and releasably engaged to said first side of said body, said collection bowl having separate first and second collection zones with a separation wall therebetween, said first collection zone disposed below said first contaminant outlet to collect liquid contaminants from said first contaminant outlet as fuel passes through the filter unit, said second collection zone disposed below said second contaminant outlet to collect liquid contaminant from sAid second contaminant outlet as fuel passes through the filter unit; and
(c) first and second drain ports for respectively draining said first and second collection zones; and
wherein, in operation, said first and second collection zones are completely walled off from each other by said separation wall with the only communication between said first and second collection zones being through said body by way of said first contaminant outlet, and wherein said first and said second contaminant outlets allow free communication between said first and second collection zones, and wherein said filter media includes at least a water repelling-action portion.

12. The filter assembly of claim 11 wherein said collection bowl includes centrally located threads and engaged to central mating threads on said first side of said body, and said first contaminant outlet is within said mating threads of said body, and said second contaminant outlet is outside of said mating threads of said body.

13. The filter assembly of claim 12 wherein said body is cylindrical and said second contaminant outlet is one of a first series of holes outside of said mating threads arranged in a circumferential pattern and radially inward from said filter media.

14. The filter assembly of claim 13 wherein said body comprises an outer casing and an end cap, said outer casing having a central hole on said first side of said body, and wherein said first contaminant outlet and said first series of holes extend through said end cap and are disposed within said central hole of said outer casing.

15. The filter assembly of claim 14 wherein said outer casing is made of metal and said end cap is made of plastic.

16. The filter assembly of claim 12 wherein said body is cylindrical and said second contaminant outlet is radially inward from said filter media.

17. The filter assembly of claim 16 wherein said collection bowl threads are mounted at the top of said separation wall.

18. The filter assembly of claim 17 wherein said filter media is homogenous.

19. An invention comprising a water repelling-action filter unit including:
(a) a cylindrical body having a fuel inlet port and fuel outlet port, and first and second contaminant outlets disposed on a first side of said body, both said first and second contaminant outlets directly communicating with a common chamber within said body;
(b) a water repelling-action filter media disposed in a closed loop within said body and around said chamber; and
(c) mating threads on said first side of said body for mating with threads on a contaminant collection bowl and a cylindrical portion at said first side of said body, said first contaminant outlet within said cylindrical portion and said second contaminant outlet outside of said cylindrical portion; and
wherein said filter unit is operative to support a contaminant collection bowl with separate first and second contaminant collection zones disposed respectively beneath said first and second contaminant outlets.

20. The invention of claim 19 wherein said second contaminant outlet is one of a first series of holes arranged in a circumferential pattern outside of said cylindrical portion and all in direct communication with said common chamber, and said common chamber is centrally located.

21. The invention of claim 20 wherein said first series of holes are radially inward from said filter media.

22. The invention of claim 19 wherein said filter media within said filter cartridge is single, integral, and radially continuous.

23. The invention of claim 22 wherein said fuel inlet port is centrally located on a second side of said body opposite said first side of said body and said fuel inlet port is bounded by second side threads and said fuel outlet port is on said second side of said body outside said second side threads.

24. The invention of claim 22 wherein said body comprises an outer casing and an end cap, said outer casing having a central hole on said first side of said body, and wherein said first contaminant outlet and said first series of holes extend through said end cap and are disposed within said central hole of said outer casing.

25. The invention of claim 24 wherein said outer casing further has a second series of holes arranged in a circumferential pattern on said first side of said body and said end cap plugs said outer series of slots.

26. The invention of claim 24 wherein said outer casing is made of metal and said end cap is made of plastic.

27. The invention of claim 22 wherein said second contaminant outlet is one of a first series of holes arranged in a circumferential pattern outside of said mating threads and all in direct communication with said common chamber, and said common chamber is centrally located.

28. The invention of claim 22 further comprising:
a contaminant collection bowl supported by said body and releasably engaged to said first side of said body, said collection bowl having separate first and second collection zones with a separation wall therebetween, said first collection zone disposed below said first contaminant outlet to collect liquid contaminants from said first contaminant outlet as fuel passes through the filter unit, said second collection zone disposed below said second contaminant outlet to collect liquid contaminant from said second contaminant outlet as fuel passes through the filter unit;

first and second drain ports for respectively draining said first and second collection zones; and wherein, in operation, said first and second collection zones are completely walled off from each other by said separation wall with the only communication between said first and second collection zones being through said body by way of said first contaminant outlet, and wherein said first and said second contaminant outlets allow free communication between said first and second collection zones.

* * * * *